C. COOPER.
COMPRESSED AIR MOTOR MACHINE.
APPLICATION FILED JAN. 2, 1913.
1,131,913.
Patented Mar. 16, 1915.
2 SHEETS—SHEET 2.
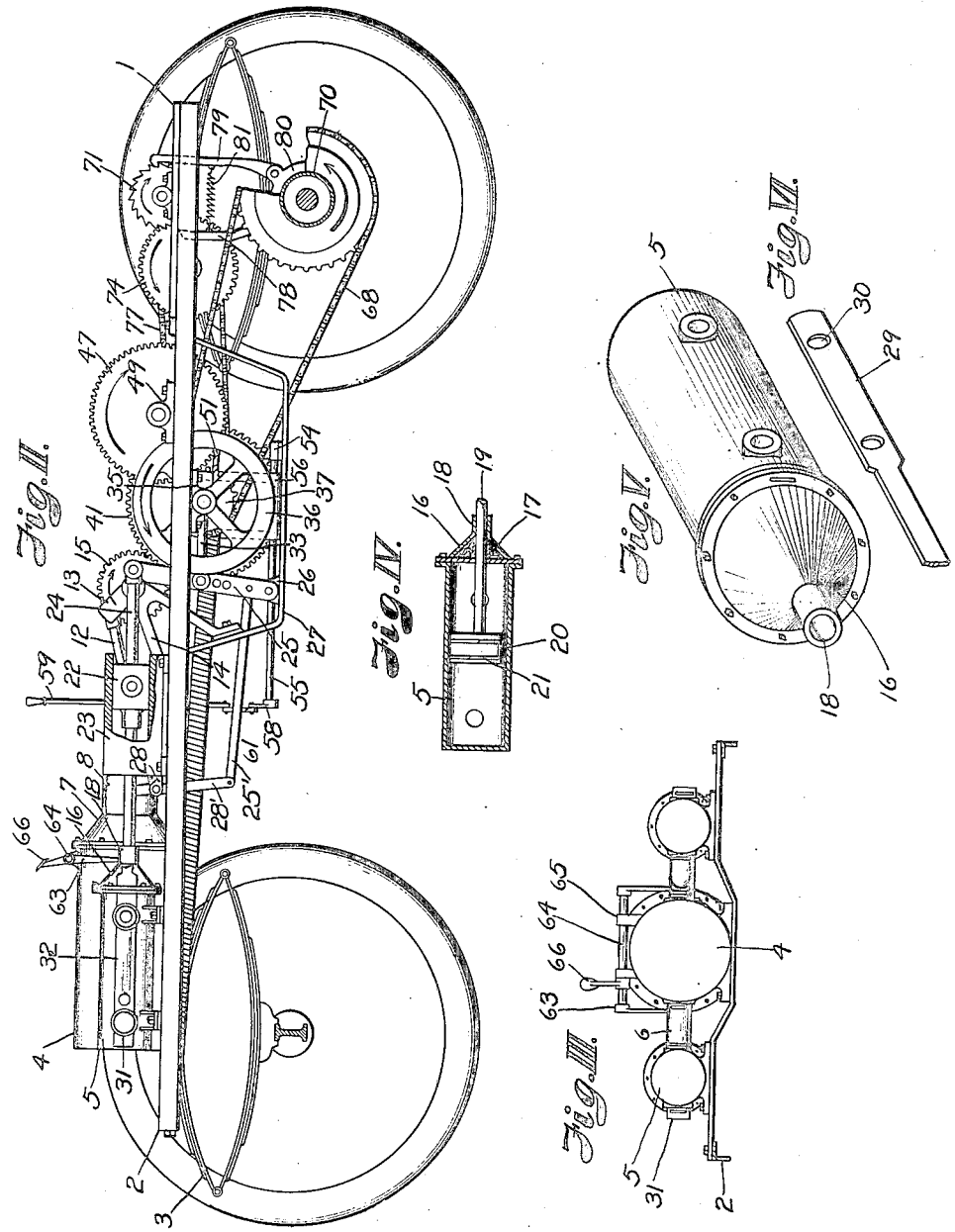
WITNESSES:
James Murphy
Walter J. Franey
INVENTOR
Charles Cooper

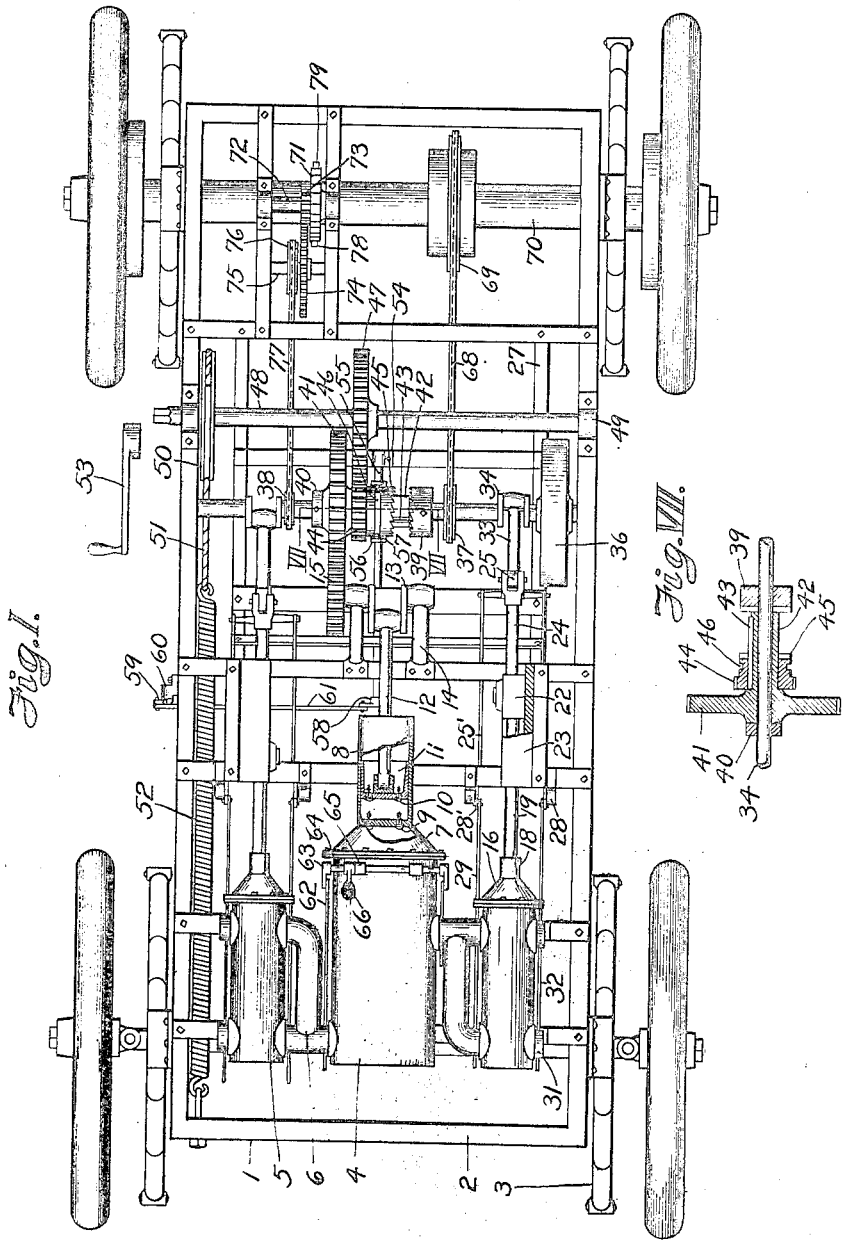

UNITED STATES PATENT OFFICE.

CHARLES COOPER, OF KANSAS CITY, MISSOURI, ASSIGNOR OF ONE-THIRD TO CHARLES A. GROSS, OF KANSAS CITY, MISSOURI.

COMPRESSED-AIR MOTOR-MACHINE.

1,131,913.     Specification of Letters Patent.     Patented Mar. 16, 1915.

Application filed January 2, 1913. Serial No. 739,909.

*To all whom it may concern:*

Be it known that I, CHARLES COOPER, a citizen of the United States, residing at Kansas City, in the county of Jackson and State of Missouri, have invented a Compressed-Air Motor-Machine, of which the following is a specification.

This invention relates to motive power for motor vehicles and has for its principal object to provide a plurality of power cylinders, a compressed air storage tank to feed the cylinders and a pump for compressing air in the storage tank; together with an auxiliary power device adapted for operation by the vibration of the vehicle.

A further object is to provide the improved details of structure hereinafter described and illustrated in the accompanying drawings, wherein:

Figure I is a plan view of a motor vehicle constructed according to my invention. Fig. II is a side elevation of the same, the wheels and springs on the near side being removed for better illustration. Fig. III is an end view of the power cylinders and storage tank. Fig. IV is a longitudinal sectional view of one of the power cylinders. Fig. V is a perspective view of the same, showing the valve parts. Fig. VI is a detail perspective view of the slide for opening and closing the valves. Fig. VII is a longitudinal sectional view on the line VII—VII, Fig. I.

Referring more in detail to the parts: 1 designates the underframe of a motor vehicle, to which is supported on springs 3 in any ordinary manner.

Mounted on the forward part of the chassis is a plurality of cylinders comprising a storage cylinder 4 and two power cylinders 5 which lie on each side of the storage cylinder and are connected by means of Y pipes 6 to opposite ends of the storage cylinder.

The storage cylinder 4 is provided with a cap 7 to which is secured an air pump 8 having exhaust valves 9, inlet valves 10, piston 11 and connecting rod 12, the latter being connected to a crank shaft 13 revolubly mounted in brackets 14 and provided with a pinion 15.

The power cylinders are identical in construction, each being provided with a cap 16 containing a packing 17 of cotton saturated with oil and having a bearing 18 in which a rod 19 is slidably mounted, one end of the rod having a piston 20 slidably mounted in the power cylinder and provided with rings 21, the other end being fixed in a cross head 22 slidable in grooved brackets 23 on cross members of the chasis.

Pivotally mounted in the cross head 22 is a connecting rod 24, one end of which is pivotally connected with a lever 25 that is in turn pivotally connected to bearings 26 on a sub-frame 27.

Pivotally connected with each side of lever 25 are links 25' that connect with levers 28' mounted on bearings 29, the opposite ends of levers 28' being connected with bars 29, having apertures 30 which are slidably mounted in the flange 16 and in the Y pipes 6 and are adapted to alternately open and close the pipes.

On the opposite side of the power cylinder are exhaust pipe connections 31 having sliding bars 32 similar to bars 29 and which are adapted to open and close the pipes reversely from the Y pipe valves.

Near the center of levers 25 is pivotally connected a connecting rod 33, the opposite end of which is revolubly mounted on a crank shaft 34 revolubly mounted in bearings 35 and provided with a fly-wheel 36, sprocket wheels 37 and 38, a clutch member 39 and a collar 40. Revolubly mounted between clutch member 39 and collar 40 is a gear wheel 41 which meshes with gear 15 and which is provided with an elongated hub 42 having a feather key 43 upon which is slidably mounted a gear wheel 44 having a clutch portion 45 and a peripheral groove 46. Gear wheel 44 meshes with a gear wheel 47 rigidly mounted on a shaft 48 which is revolubly mounted in bearings 49 and which is provided with a winch 50 to which is secured a cable 51 that connects with a heavy spring 52 secured to the forward part of the frame 2.

The outer end of the shaft 48 is squared to receive a crank 53 for the purpose presently described.

Pivotally mounted in bearings 54 on sub-frame 27 is a shaft 55 upon which is secured a yoke 56 having inturned pins 57 at the ends adapted to rest in groove 46 of gear wheel 44.

Also secured to shaft 54 is a lever 58 which is connected with a hand lever 59 that is pivotally mounted in bearing 60 by means of a link 61.

In order to close the ports of the storage cylinder I have provided a valve mechanism which consists of bars 62 slidably mounted in Y pipes 6 adjacent the cylinder and connected with levers 63 which are secured to a shaft 64 revolubly mounted in bearings 65 on the cylinder and provided with a foot pedal 66.

The bars 32 are moved so as to close the Y pipes leading from the storage cylinder, and hand lever 59 is shifted so as to move gear 44 and clutch 45 into a neutral position. The crank 53 is then placed on shaft 48 and turned so as to tension the spring 52, in which position the gear 44 is shifted into mesh with gear 47.

Upon releasing the crank 53 the spring 52 will tend to revolve the gearing and actuate pump 8 to accumulate an air pressure in the storage tank. As soon as sufficient pressure has been accumulated in the tank the gear 44 is thrown into neutral position and foot pedal 66 moved to establish connection between the storage cylinder and the power cylinders to reciprocate the pistons 20 and revolve the crank shaft 34.

In order to partly compensate for the air consumed in operating the power cylinders the clutch 45 is thrown into mesh with the clutch 39 so as to actuate the air pump 8.

The sprocket wheel 37 is provided with a sprocket chain 68 which passes over a sprocket wheel 69 on the axle 70 thereby utilizing the power to propel the vehicle.

As an auxiliary means of propulsion, I have mounted a ratchet wheel 71 rigidly on a shaft 72 and provided said shaft with a gear wheel 73 that meshes with a gear 74 revolubly mounted on a shaft 75 and having a sprocket wheel 76 that is connected to sprocket wheel 38 by means of a sprocket chain 77. The ratchet wheel 71 is acted upon by oppositely facing pawls 78—79 which are pivotally mounted in a collar 80 on the axle 70 and held in operative position by means of a spring 81.

It is apparent that as the vehicle passes over rough roads and the springs yield that the pawls will grasp the ratchet wheel both on the upward and downward movement thus imparting revolution to the gearing and assisting in propelling the crank shaft 34.

Having thus described my invention, what I claim as new therein, and desire to secure by Letters-Patent, is:

1. The combination with a crank shaft, of a power cylinder having intake and exhaust ports and comprising a piston and its rod, means for supplying motive fluid to the cylinder, a lever having pivotal mounting at one end and operative connection with the piston rod at its opposite end, a crank shaft, a rod connecting the shaft with an intermediate point on said lever, a valve for controlling intake to the cylinder and operatively connected with the piston rod, and a valve, for controlling exhaust from the cylinder, operatively connected with said lever.

2. The combination with a crank shaft, of a power cylinder having intake and exhaust ports, and comprising a piston and its rod, apertured slides adapted to operate in unison for opening and closing opposite ports in the reverse order, means for supplying motive fluid to the cylinder, a lever having pivotal mounting at one end and operatively connected with the piston rod at its opposite end, a rod connecting the crank shaft with an intermediate point on said lever, pivotally mounted bars connected with said slides, and links operatively connected with said bars and with the lever for actuating said slides.

3. In a device of the character described, a storage cylinder for containing a motive fluid, a power cylinder, a pipe leading from said storage cylinder to one end of said power cylinder, a branch on said pipe communicating with the other end of said power cylinder, a piston in said cylinder, a piston rod on said piston, a lever pivotally mounted at one end and to the piston rod at the other, and valve mechanism operable from said lever for controlling the flow of motive fluid through said pipe and branch.

4. In a device of the character described, a storage cylinder for containing a motive fluid, a plurality of power cylinders, pipes leading from the storage cylinder to one end of each of the power cylinders, a branch on each of said pipes communicating with the opposite ends of each of said power cylinders, valves for simultaneously controlling the flow of motive fluid through said pipes, a foot pedal for simultaneously actuating said valves, a piston in each of said power cylinders, piston rods on said pistons, levers pivotally mounted at one end and to said rods at the other, a second set of valves slidably mounted adjacent said power cylinders and adapted to alternately open and close said pipes and branches, and means for connecting said second valves with said lever.

CHARLES COOPER.

Witnesses:
 JAMES MURPHY,
 JOHN C. LONG.